(12) United States Patent
Usuba et al.

(10) Patent No.: US 7,573,989 B2
(45) Date of Patent: Aug. 11, 2009

(54) TELEPHONE COMMUNICATIONS APPARATUS

(75) Inventors: Shinji Usuba, Tokyo (JP); Hiromi Aoyagi, Kanagawa (JP); Yumiko Araki, Chiba (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 791 days.

(21) Appl. No.: 11/189,052

(22) Filed: Jul. 26, 2005

(65) Prior Publication Data

US 2006/0018451 A1 Jan. 26, 2006

Related U.S. Application Data

(63) Continuation of application No. PCT/JP2004/000666, filed on Jan. 26, 2004.

(30) Foreign Application Priority Data

Jan. 27, 2003 (JP) ............... 2003-17078

(51) Int. Cl.
*H04M 11/00* (2006.01)
(52) U.S. Cl. ............... 379/101.01; 455/556.1; 455/570; 455/403
(58) Field of Classification Search ......... 379/101.01, 379/267, 214, 430; 455/570, 219, 221, 403, 455/412.1, 466
See application file for complete search history.

(56) References Cited

U.S. PATENT DOCUMENTS

| 5,694,467 | A | * | 12/1997 | Young, III | ............... 379/430 |
| 5,844,158 | A | | 12/1998 | Butler et al. | |
| 2001/0031650 | A1 | * | 10/2001 | Baiker et al. | ............... 455/570 |
| 2001/0041588 | A1 | * | 11/2001 | Hollstrom et al. | ........... 455/556 |
| 2001/0339873 | | | 11/2001 | Yi et al. | |

(Continued)

FOREIGN PATENT DOCUMENTS

EP 1 104 968 A1 6/2001

(Continued)

OTHER PUBLICATIONS

UK Patent Office Search and Examination Report for Application No. GB 0515011.5.

(Continued)

*Primary Examiner*—Curtis Kuntz
*Assistant Examiner*—Phung-Hoang J Nguyen
(74) *Attorney, Agent, or Firm*—Venable LLP; Michael A. Sartori; Yao Wang

(57) ABSTRACT

A telephone communications apparatus for mixing a music signal with a speech signal, in which the gamut of music that may be enjoyed, such as a calling/called party, or the sorts of telephone terminal, can be expanded as compared to a conventional system. The apparatus includes a reproducing circuit for reading out a music signal recorded in a recording medium loaded thereon from the recording medium to reproduce the read out music signal, a setting circuit responsive to an operation by an operator for setting whether or not the music signal is to be mixed with a transmitting signal and/or a received signal, a mixer for mixing the music signal reproduced with the transmitting signal and/or the received signal, and a control circuit operative in response to the setting circuit for determining whether or not to enable the mixer to mix.

9 Claims, 7 Drawing Sheets

U.S. PATENT DOCUMENTS

2003/0198339 A1 * 10/2003 Roy et al. .............. 379/387.01

FOREIGN PATENT DOCUMENTS

| EP | 1333651 | 8/2003 |
| JP | 4-275749 | 1/1992 |
| JP | 11-331379 | 5/1998 |
| JP | 2001-60993 | 6/2001 |
| WO | WO 02/21815 A2 | 3/2002 |
| WO | WO 03/003157 A3 | 1/2003 |

OTHER PUBLICATIONS

Handley/Schulzrinner/Schooler/Rosenberg: "SIP: Session Initiation Protocol", Nov. 24, 2000, pp. 1-132.

* cited by examiner

| RECEIVER MIX FLAG IN QUESTION | COUNTER TRANSMITTER MIX FLAG | RESULT |
|---|---|---|
| SET | SET OR RESET | MIXING |
| RESET | SET OR RESET | NOT MIXING |

| TRANSMITTER MIX FLAG IN QUESTION | COUNTER RECEIVER MIX FLAG | RESULT |
|---|---|---|
| SET | SET | NOT MIXING |
| SET | RESET | MIXING |
| RESET | SET OR RESET | NOT MIXING |

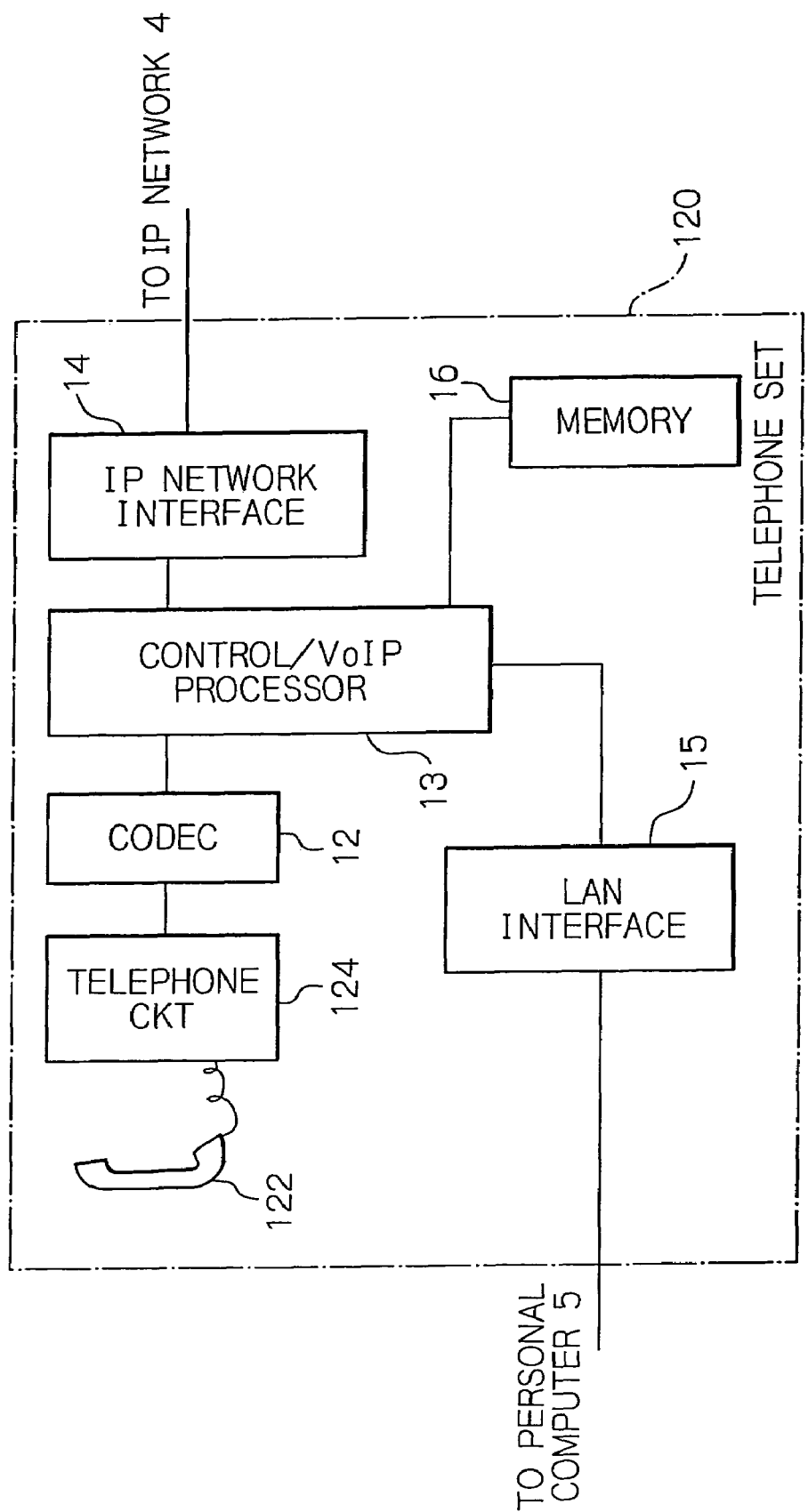

TELEPHONE COMMUNICATIONS APPARATUS

BACKGROUND OF THE INVENTION

1. Field of the Invention

The present invention relates to a telephone communications apparatus and a telephone communications system for mixing a music signal with a speech signal. More particularly, it relates to furnishing music as background sound during speech.

2. Description of the Background Art

A conventional telephone terminal in which music is provided as background sound during speech is disclosed in Japanese Laid-Open Patent Publication 2001-60993.

The telephone terminal disclosed in the above publication is directed to a car phone or a mobile phone and mixes a music signal with a speech signal (transmitting and received signals) to send out the resulting signal or emanate the resulting voice as audible sound.

However, in this conventional telephone terminal, a music signal is mixed even during the time when an effective speaker's voice is carried on a speech signal, and therefore there is a risk that the music signal renders the speaker's voice less audible to interfere with conversation. In order to avoid this interference, it may be contemplated to render the mix ratio of a music signal to a speech signal adjustable. However, when the subscriber talks and transmits a transmitting signal, he or she would like to adjust the mix ratio, but would fail to appropriately adjust it because he or she could not monitor the resultant, mixed signal.

Moreover, in the above-described conventional telephone terminal, music data are stored in and read out from the memory and converted from a digital to an analog form to be mixed thereafter. The number of the music pieces stored is limited, or only a portion of a music piece may be stored, due to the storage capacity of the memory. That gives rise to allowing only some fixed music pieces to be prepared as the background sound to the extent that, when the conversation continues for a long period of time on the phone the same background sound has to repetitively be played.

In addition, in the conventional technology, if the telephone terminal used is not provided with the background music function, then the subscriber is unable to enjoy the background sound of music.

There has thus been a demand for a telephone communications apparatus and a telephone communications system which make the background music function available to an extended number of subscribers or applicable to an extended number of types of terminal without dependency on the sorts of telephone terminal.

SUMMARY OF THE INVENTION

It is therefore an object of the present invention to provide a telephone communications apparatus and a telephone communications system which make it possible to resolve the above-mentioned drawbacks of the prior art.

For accomplishing the aforementioned object, the present invention provides a telephone communications apparatus comprising a reproducing circuit for reading out a music signal recorded in a recording medium loaded thereon from the recording medium to reproduce the read out music signal, a setting circuit responsive to an operation by an operator for setting whether or not the music signal is to be mixed with at least one of a transmitting signal and a received signal, a mixer for mixing the music signal reproduced with at least one of the transmitting signal and the received signal, and a control circuit operative in response to the setting circuit for determining whether or not to enable the mixer to mix.

Preferably, the telephone communications apparatus further comprises a telephone number register for setting information on a first telephone number for which the transmitting signal is to be destined with the music signal mixed with the transmitting signal or a second telephone number for which the transmitting signal is to be destined without mixing the music signal with the transmitting signal. The control circuit allows the mixer to mix the music signal with the transmitting signal when the transmitting signal is to be transmitted to a destination which is the first telephone number or not the second telephone number.

Preferably, the telephone communications apparatus further comprises a content take in circuit for taking in contents set in a counterpart setting circuit of a counterpart telephone communications apparatus which is to be connected. The counterpart setting circuit is adapted for setting whether or not the music signal is to be mixed with at least one of a transmitting signal and a received signal. The control circuit preferably determines whether or not the mixer may mix based on the contents taken in.

Preferably, the telephone communications apparatus further comprises a decision circuit for determining a sound or soundless period of a speech signal with which the music signal is to be mixed. The control circuit is preferably responsive to a result from the decision circuit to control a mix ratio of the music signal to the speech signal. In this case, the control circuit progressively decreases the mix ratio towards a smallest value during transition from the soundless period to the sound period, while progressively increasing the mix ratio towards a largest mix ratio during transition from the sound period to the soundless period.

The present invention also provides a telephone communications system wherein a first telephone communications apparatus comprises a reproducing circuit for reading out a music signal recorded in a recording medium loaded thereon from the recording medium to reproduce the read out music signal, a setting circuit responsive to an operation by an operator for setting whether or not the music signal is to be mixed with at least one of a transmitting signal and a received signal, a mixer for mixing the music signal reproduced with at least one of the transmitting signal and the received signal, and a control circuit operative in response to the setting circuit for determining whether or not to enable the mixer to mix. The first telephone communications apparatus is connected to a telephone network, and communicable with a second telephone communications apparatus over the telephone network.

The present invention also provides a telephone communications apparatus comprising a speech channel establishing circuit for establishing a speech channel over a telephone network, a music channel establishing circuit for establishing a music channel in distinction from the speech channel, the music channel conveying a music signal provided from the telephone network, and a mixer for mixing the music signal with at least one of a transmitting signal and a received signal.

In this case, the telephone communications apparatus further comprises a setting circuit for allowing an operator to set whether or not the music signal is to be mixed with at least one of the transmitting signal and the received signal, and a decision circuit responsive to the setting circuit for determining whether or not the mixer circuit is allowed to mix the music signal.

Preferably, the telephone communications apparatus further comprises a decision circuit for determining a sound or soundless period of a speech signal with which the music signal is to be mixed, and a control circuit responsive to a result from the decision circuit for controlling a mix ratio of the music signal to the speech signal. The control circuit progressively decreases the mix ratio towards a smallest value ratio during transition from the soundless period to the sound period, while progressively increasing the mix ratio towards a largest value during transition from the sound period to the soundless period.

The present invention also provides a telephone communications system wherein a first telephone communications apparatus comprises a speech channel establishing circuit for establishing a speech channel over a telephone network, a music channel establishing circuit for establishing a music channel in distinction from the speech channel the music channel conveying a music signal provided from the telephone network, and a mixer for mixing the music signal with at least one of a transmitting signal and a received signal. The first telephone communications apparatus is connected to a telephone network. A music signal distributing device is connected through the telephone network to a second telephone communications apparatus over the speech channel established. The music signal distributing device reproduces a music signal and distributes the music signal reproduced over the music channel established to at least the first telephone communications apparatus.

Preferably, the music signal distributing device recognizes that a calling or called subscriber of the first or second telephone communications apparatus is under contract for a music distributing service to distribute the music signal.

The present invention also provides a telephone communications system comprising a music signal mixer provided on a speech channel established between two telephone communications apparatus over a telephone network. The music signal mixer reproduces a music signal and mixes the music signal with a speech signal flowing in at least one direction and sending out a signal mixed. In this case, the music signal mixer further comprises a decision circuit for determining whether the speech signal with which the music signal is to be mixed has a sound period or a soundless period, and a control circuit responsive to a result from the decision circuit for controlling a mix ratio of the music signal to the speech signal. The music signal mixer confirms that a calling or called subscriber of the telephone communications apparatus is under contract for a music distributing service to mix the music signal.

Thus, according to the present invention, such a telephone communications apparatus and a telephone communications system may be provided in which more calling and/or called parties may enjoy the music background function without dependency on e.g. the sorts of telephone terminal, and in which it is possible to enlarge the gamut of the music background function that may be enjoyed.

BRIEF DESCRIPTION OF THE DRAWINGS

The objects and features of the present invention will become more apparent from consideration of the following detailed description taken in conjunction with the accompanying drawings in which.

FIG. 9 shows in a schematic block diagram a still further embodiment of the telephone set in accordance with the invention.

DESCRIPTION OF THE PREFERRED EMBODIMENTS

Figure 2:
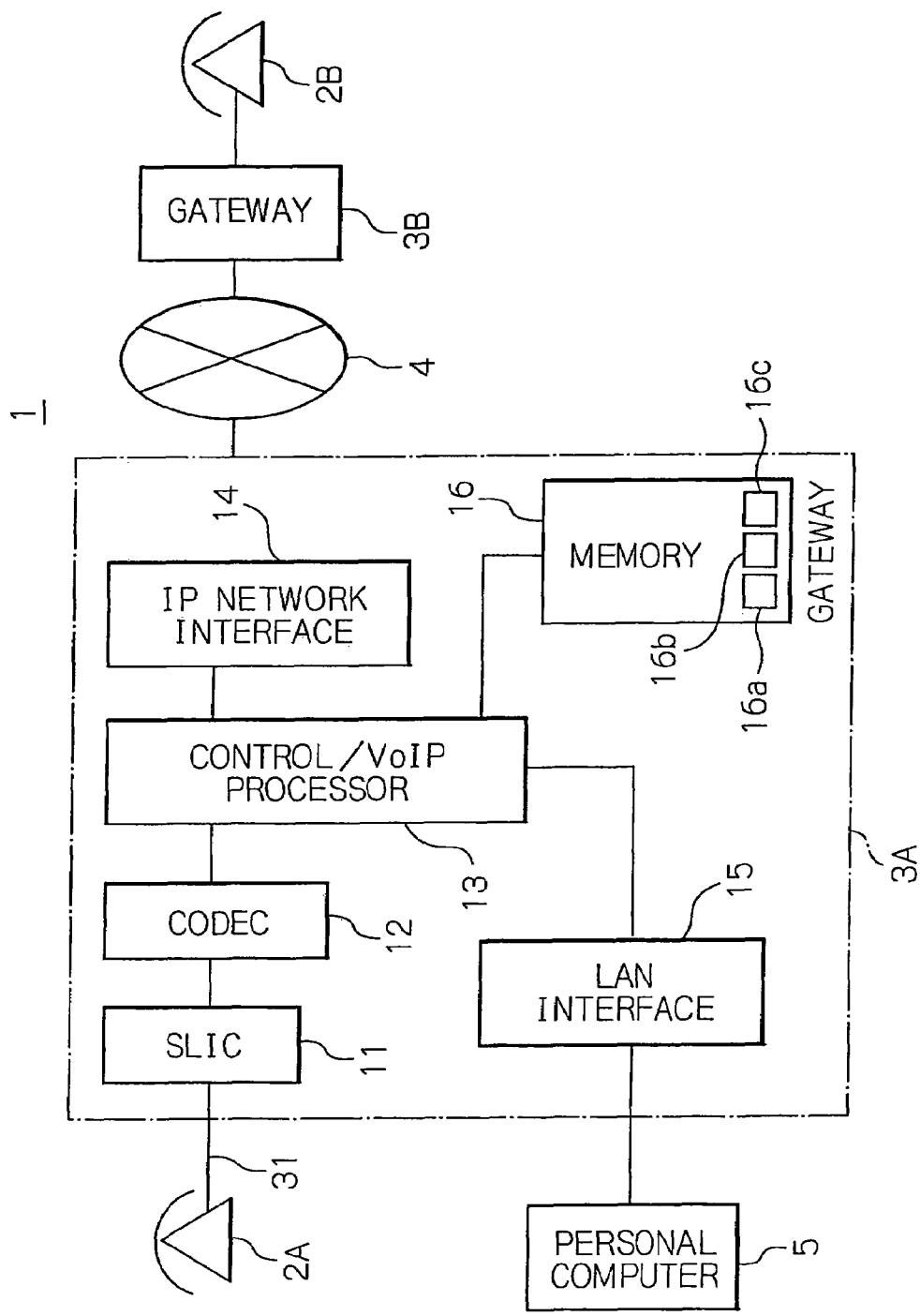
FIG. 2 is a schematic block diagram showing the structure of a telephone communications system of the first embodiment.

Referring now to the accompanying drawings, a telephone communications apparatus and a telephone communications system according to a first embodiment of the present invention will be described in detail. FIG. 2 shows, in a schematic block diagram, the structure of the telephone communications system and the inner structure of a gateway device in the first embodiment. In the figure, the first embodiment includes a voice communication system 1, which comprises gateway (GW) devices 3A and 3B, connected to an IP (Internet Protocol) network 4. The gateway devices 3A and 3B have telephone sets 2A and 2B interconnected, respectively, and represent a telephone communications apparatus of the first embodiment.

The telephone sets 2A and 2B are adapted for communicating with each other with voice over the IP network 4. The telephone sets 2A and 2B may be telephone subscriber sets for public switched telephone network, broadband telephone sets, or cordless telephone sets. For simplicity in the figures, only two sets of telephone terminal and gateway device are shown to be interconnected to the IP network 4. In practice, however, a lot of such terminals and gateway units may be interconnected to the IP network 4.

From the viewpoint of a voice communication system, one telephone subscriber set 2B may be a broadband telephone terminal compatible with the VoIP (Voice over IP) feature and directly connected to the IP network 4, rather to the gateway device 3B.

The gateway device 3 also includes therein an information processing apparatus, such as a personal computer, having the function of making access to a CD-ROM (Compact Disk— Read-Only Memory), which may include a CD for audio.

The other telephone subscriber set 2A may also be a broadband telephone set capable of transmitting and/or receiving broadband voice signals, or a general, telephone subscriber set The telephone set 2A is connected to the gateway device 3A by an analog line 31. Preferably in the embodiment, the telephone set 2A is a broadband telephone set for the purpose of exploiting the IP network 4.

The gateway devices 3A and 3B are provided e.g. within the premises of a user or subscriber, and allow the telephone sets 2A and 2B, respectively interconnected thereto, to communicate over the IP network 4. The gateway devices 3A and 3B may be of the type enabling communication by the respective telephone sets 2A and 2B not only over the IP network 4 but also over the public switched telephone network.

The gateway device 3A has a personal computer 5 interconnected thereto for data transmission over the IP network 4. The computer 5 operates, in the present, first embodiment, as a sound source for implementing the music background function. Specifically, the personal computer 5 is adapted to read out music data from an audio CD; loaded thereon, and sends it out to the gateway device 3A.

The gateway device 3A includes a subscriber circuit (SLIC) 11, a codec unit 12, a control/VoIP processor 13, an IP network interface 14, a LAN (Local Area Network) interface 15 and a memory circuit 16, interconnected as illustrated. The same holds for the other gateway device 3B.

The subscriber circuit 11 operates for inter facing with the telephone set 2A. The subscriber circuit 11 may be adapted to directly send out an off-hook detection signal representative of an off-hook of the terminal 2A, and a PB (pushbutton) signal representing a destination number of a called subscriber set to the control/VoIP processor 13.

The codec unit 12 is adapted to convert a signal (call control and speech signals) supplied over the subscriber circuit 11 from the telephone set 2A into corresponding digital signals to feed the signals to the control/VoIP processor 13, or convert the digital signal (call control and speech signals) fed from the control/VoIP processor 13 and directed to the telephone set 2A into corresponding analog signals to send the latter signals to the subscriber circuit 11. In this first embodiment, the codec 12 is mainly responsible for analog-to-digital (A/D) conversion and digital-to-analog (D/A) conversion while the control/VoIP processor 13 is for encoding prior to assembling IP packets, and decoding successive to disassembling IP packets.

The control/VoIP processor 13 is implemented by a one-chip processor, including a CPU(Central Processor Unit) and a DSP (Digital Signal Processor) therein. The processor 13 is adapted to exploit the storage area of the memory circuit 16 as its work area to control the overall operation of the gateway device 3A and perform VoIP processing, such as assembling and disassembling IP packets, in response to program sequences on the basis of fixed or registered data stored in the memory circuit 16.

The IP network interface 14 operates for interfacing with the IP network 4. The LAN interface 15 operates for interfacing with the personal computer 5 in compatible with e.g. the 10/100 BASE-T or USB (Universal Serial Bus) requirements.

The memory circuit 16 is adapted to store therein program sequences, and fixed and/or registered data, which will be needed by the control/VoIP-processor 13 during processing, and also function as a work area for use in processing by the control/VoIP processor 13.

In this first embodiment, the memory circuit 16 has data of a list 16a stored therein, which includes destination telephone numbers, a transmitter mix flag 16b and a receiver mix flag 16c. Destination telephone numbers stored are telephone numbers for which a transmitting signal, i.e. a signal to be transmitted, is to be destined with a music signal mixed therewith as background sound. The destination telephone number may be replaced with other types of information on destination identifications, such as an IP address. Alternatively, the list 16a, stored in the memory circuit 16, may be adapted to include destination telephone numbers, for which a transmitting signal is to be destined without mixing a music signal therewith. The operation of the embodiment, which will be described later on, is directed to the former case, i.e. the list 16a is adapted to include the destination telephone numbers, for which a transmitting signal is to be destined with a music signal mixed therewith. The destination telephone numbers, transmitter mix flag 16b and receiver mix flag 16c may be set in the list 16a by the operator acting on a PB key, not shown, of the telephone set 2A or a keyboard, also not shown, of the personal computer 5.

Figure 1:
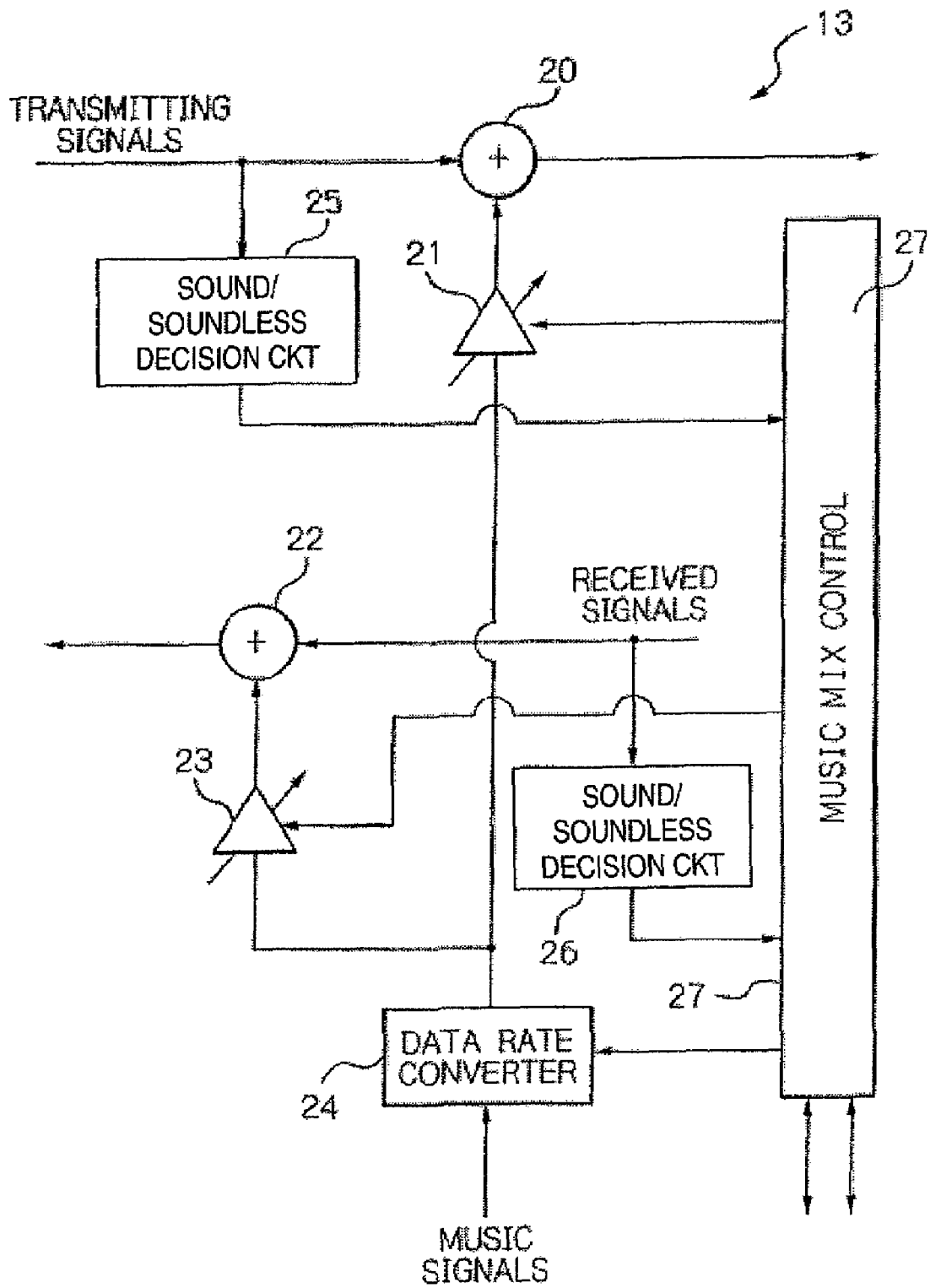
FIG. 1 is a schematic functional block diagram showing the music mixing function of a control/VoIP processor in accordance with a first embodiment of the present invention.

FIG. 1 is a schematic block diagram showing the functional structure implementing the music background function of the control/VoIP processor 13. More specifically, the control/VoIP processor 13 is formed by a one-chip processor containing a CPU or a DSP and executes the processing under the control of the software programs. The structure shown in FIG. 1 may also be implemented by the hardware.

Referring to FIG. 1, the control/VoIP processor 13 includes a mixer circuit 20 and a variable-gain circuit 21 for a transmitting signal stream, and another mixer circuit 22 and another variable-gain circuit 23 for a received signal stream, interconnected as illustrated. The processor 13 further includes a data rate converter 24, a sound/soundless decision circuit 25 for verifying the presence or absence of sound in a transmitting signal, another sound/soundless decision circuit 26 for verifying the presence or absence of sound in received signals, and a music mix control circuit 27, interconnected as shown.

The data rate converter 24 is adapted to convert the data rate of music signals or data supplied from the LAN interface 15 into the data rate of speech signals (transmitting and received signals) in the form of digital signal, under the control of the music mix-control circuit 27. In this stage, if a music signal supplied from the LAN interface 15 differs in bits per sample from a speech signal in the form of digital signal, the number of bits per sample of the music signal is made in consistent with that of the speech signal.

In an application in which the data rate and number of bits per sample of a speech signal are fixed as well as the data rate and number of bits per sample of a music signals or data supplied from the LAN interface 15 are fixed, the data rate converter 24 may be constructed to convert e.g. the data rate without being controlled by the music mix control circuit 27.

The variable-gain circuit 21 on the transmitting signal stream and the variable-gain circuit 23 on the received signal stream are adapted to vary its gain and amplify a music signal from the data rate converter 24, under the control of the music mix control circuit 27.

The mixer circuit 20 on the transmitting signal stream is adapted to mix the music signal, amplified by the variable-gain circuit 21, as background sound, with the transmitting signal from the codec 12. The so-mixed transmitting signal is in turn encoded and then assembled into an IP packet.

The mixer circuit 22 of the received signal system is adapted for mixing the music signal, amplified by the variable-gain circuit 23, as background sound with a received signal. The mixer circuit 22 on the received signal stream is supplied with, a received signal, into which a received IP packet has been disassembled and decoded. The mixed received signal will be supplied to the codec 12.

The sound/soundless decision circuit 25 is adapted to determine the presence or absence of sound in a transmitting signal, transferred towards the mixer circuit 20, to send the results of decision to the music mix control circuit 27. In a similar manner, the other sound/soundless decision circuit 26 is adapted to determine the presence or absence of sound in a received signal, transferred towards the other mixer circuit 22, to send the results of decision to the music mix control circuit 27.

Figures 3, 4, 5:
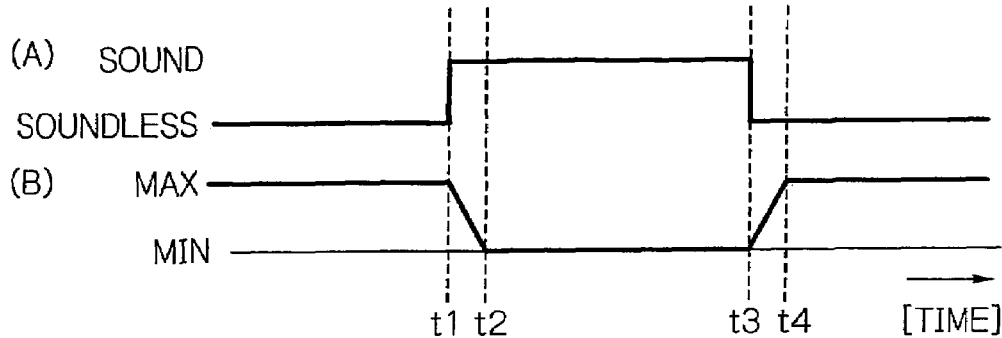
FIG. 3 is a timing chart useful for understanding the mix control of the first embodiment.
FIG. 4 illustrates the relationship between mix flags and the possibility of mixing a received signal in the first embodiment.
FIG. 5 illustrates the relationship between mix flags and the possibility of mixing a transmitting signal in the first embodiment.

The music mix control circuit 27 is adapted for controlling over mixing a music signal with a speech signal. When mixing, the music mix control circuit 27 controls the gain of the variable-gain circuits 21 and 23 in accordance with the results of decision made by the sound/soundless decision circuits 25 and 26, respectively, as shown in FIG. 3, lines (A) and (B). In FIG. 3, lines (A) and (B) represent the results from the decision on the presence or absence of sound and the variable gain, respectively, on the time axis.

During the soundless period of a speech signal (transmitting or received signal), a music signal is controlled by the music mix control circuit 27 to its maximum gain. Upon transition of the speech signal from its soundless period to its sound period, the gain is gradually changed over a predetermined time (t1 to t2) from its maximum value MAX to its minimum value MIN (called fading-out), which is maintained during the subsequent sound period (t2 to t3). On transition of a speech signal from its sound period to its soundless period, the gain is gradually changed over a predetermined time (t3 to t4) from its minimum value MIN to its maximum value MAX (called fading-in), which is maintained during the subsequent soundless period. In other words, basically, a music signal proves background sound only during the soundless period of a transmitting or received signal, while the transition from the soundless period to the sound period and vice versa occur moderately in a fading-in or -out fashion. The above-stated way of mixing prohibits speech signals from becoming difficult to listen due to music signals.

For the above-mentioned maximum gain MAX, an optional value not larger than unity suffices. It is however desirable that the maximum gain MAX is set to e.g. 0.5 so that the average level of a music signal is smaller than the average level of a speech signal in order for a music signal to serve as background music (BGM). The minimum gain MIN may be zero, in which case a music signal is not mixed. The minimum gain MIN may also be in the order of 0.1 or 0.2, for which the music signal level is appreciably smaller than the speech signal level.

The music mix control circuit 27 is adapted to determine, under the rules described below, whether or not a music signal is to be mixed with a received or transmitting signal. In the following, the transmitter and receiver mix flags in the gateway device 3A on a calling side are referred to as the transmitter and receiver mix flags in question, respectively, while the transmitter and receiver mix flags in the counterpart gateway device 3B on a called side are referred to as the counterpart transmitter and receiver mix flags, respectively. It should be noted that, in an application in which the counterpart gateway device 3B is not provided with the mixing function for a speech signal, or the counterpart telephone set 2B is directly interconnected to the IP network 4, the counterpart transmitter and receiver mix flags take the reset state thereof. Of course, the mixing is not executed when an audio CD is not loaded on the personal computer 5.

Rule, R1, of mixing a received signal is depicted in FIG. 4. When the receiver mix flag in question is in its set state, a music signal is mixed with a transmitting signal, without dependency on the set or reset state of the counterpart transmitter mix flag.

When the receiver mix flag in question is in its reset state, a music signal is not mixed with a transmitting signal, without dependency on the set or reset state of the counterpart transmitter mix flag.

FIG. 5 shows Rule, R2, of mixing a transmitting signal. Prior to mixing a transmitting signal, the destination telephone number is registered in the memory circuit 16, as depicted as a telephone number 16a, to which a transmitting signal is destined with a music signal mixed.

When both the transmitter mix flag in question and the counterpart receiver mix flag are set, no music signal is mixed with a transmitting signal. When the transmitter mix flag in question is not set but the counterpart receiver mix flag is reset, a music signal is mixed with a transmitting signal. When the transmitter mix flag in question is reset, no music signal is mixed with a received signal, regardless of the set or reset state of the counterpart receiver-mix flag.

The above refers to an arbitration scheme which puts priority on the mix flag of a received signal of both parties. In that case, it is possible that different music signal are mixed between both sides. The arbitration scheme is not limited to the one described above. For example, priority may be made on either a calling or a called party on setting both the transmitter and receiver mix flags.

The operation for the telephone communications system in the first embodiment will now be described. First, the operational sequence of registering a destination telephone number will be described in a case a music signal is to be mixed with a transmitting signal, with reference to the flowchart.

At the telephone set 2A, the user or subscriber first originates a call by off-hook and enters a special service code number for registration. In the gateway device 3A, upon recognition of the special service code number, the control/VoIP processor 13 notifies the telephone set 2A of the registration mode now taken. At this time, the telephone set 2A announces that effect by sound or display. The user enters, in response, a telephone number to which a transmitting signal is destined with a music signal mixed. The control/VoIP processor 13 registers the telephone number 16a thus entered in the memory circuit 16.

The set or reset operation for the transmitter mix flag 16b or the receiver mix flag 16c is carried out by a similar sequence of operations.

Meanwhile, a key input circuit may be provided to the gateway device 3A in order to register a telephone number or to set the transmitter or receiver mix flag. The registering or setting operation may be rendered executable with the aid of a keyboard of the personal computer 5.

The operation in the gateway device 3A will now be described in detail, in a case a call is directed from the telephone set 2A to the telephone set 2B to set up a communication or speech state, by referring to the flowchart shown in FIG. 6, which mainly illustrates the mixing of a music signal.

When the telephone set 2A is in its off-hook state, and a destination or counterpart telephone number is entered, the control/VoIP processor 13 of the gateway device 3A transfers and receives control information to and from the personal computer 5 to confirm that a CD for audio has been loaded on the personal computer 5 and is ready for starting (Step S1). In case a CD for audio is not ready for starting, the processing on the mixing function, which will be described below, is not performed but only the call control processing is performed as an ordinary call originating.

When a CD for audio is ready for starting or being played, the gateway device 3A acquires the counterpart transmitter and receiver mix flags through negotiation with, or the flag request processing on, the counterpart gateway device 3B (S2). If there is no counterpart gateway device such as 3B associated with the destined telephone set 2B, as where the telephone set 2B is directly interconnected to the IP network 4, or if the counterpart gateway device 3B is not provided with the music mixing function, both flags of the counterpart are then dealt with in the reset state thereof. If the counterpart gateway device 3B is provided with the music mixing function, the gateway device 3A transmits its own transmitter and receiver mix flags to the counterpart gateway device 3B. If, during the negotiation, the counterpart telephone set 2B is determined to be busy, the gateway device 3A then escapes from the ongoing control to proceed to busy processing.

It is then determined, in accordance with the rule for mixing the received signal described with reference to FIG. 4, whether or not a music signal is to be mixed with a speech signal. When a music signal is to be mixed with a speech signal, the variable-gain circuit 23 is set to; its gain-controllable mode and, otherwise, to its non-mixing mode, i.e. with it gain zero (S3).

The control/VoIP processor 13 of the gateway device 3A verifies whether or not the current destination telephone number has been registered in the list of telephone numbers 16a in the memory circuit 16 for which a transmitting signal is destined with a music signal mixed (S4).

In a case the current destination telephone number is not a telephone number for which a transmitting signal is destined with a music signal mixed, the variable-gain circuit 21 is set to its non-mixing mode with its gain zero (S5). If the current destination telephone number is a telephone number for which a transmitting signal is destined with a music signal mixed, it is determined, in accordance with the rule for mixing a transmitting signal, described with reference to FIG. 5, whether or not a music signal is to be mixed with a speech signal. In a case a music signal is mixed with a speech signal, the variable-gain circuit 21 is set to its gain-controllable mode and, otherwise, to its non-mixing mode, i.e. gain zero (S6).

It is then checked whether or not at least one of transmitting and received signals is to be mixed (S7). If the result of the check is affirmative, the control/VoIP processor 13 commands the personal computer 5 to start playing a CD for audio (S8). It is noted that, during the period of processing steps S1 through S8, a dial tone is continuously transmitted to the telephone set 2A.

The gateway device 3A transmits and receives control signals to and from the counterpart gateway device 3B to transfer to the call-connected or communication state (S9).

Figure 6:
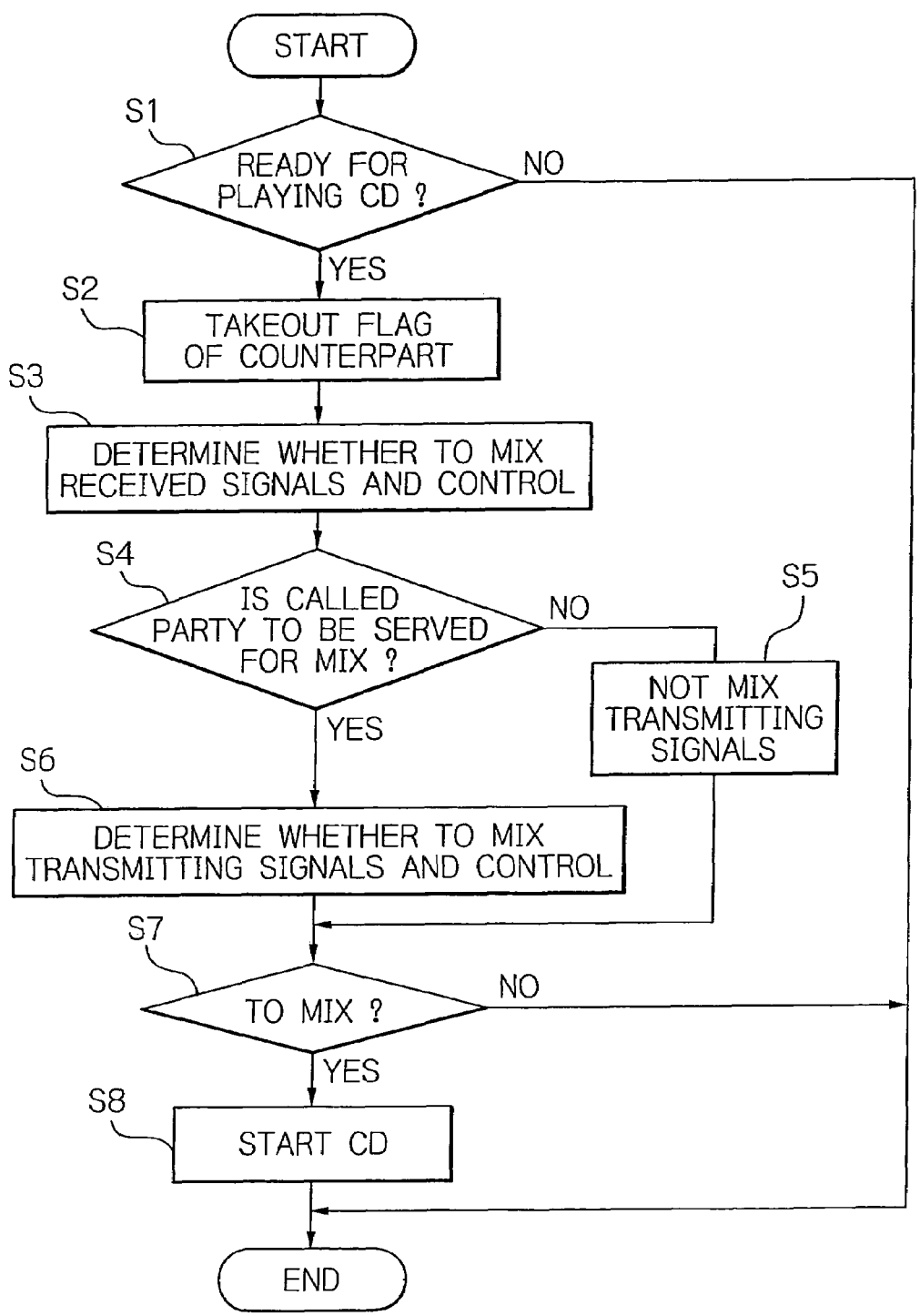
FIG. 6 is a flowchart showing the flow of the mix control of the first embodiment.

Although not shown in FIG. 6, when the gateway device 3A determines that the mixing is to be performed for transmitting and/or received signals, it verifies during communication state whether or not there is sound in a transmitting or received signal under mixing, and performs the mixing shown in FIG. 3 on the basis of the results of the sound/soundless decision.

Differently from the control shown in FIG. 6, the system may be adapted to decide that the signal mixing is to be performed when the user dials while an audio CD is played on the personal computer 5, such dialing being deemed as a command for the music signal mixing. Alternatively, the system may be adapted to decide, after a call connection being established, whether or not the mixing is to be performed, in response to the user operating on the telephone set 2A (more specifically with its PB buttons), the gateway device 3A (more specifically with its key input) or on the personal computer (more specifically with its keyboard).

The system also may be adapted for using, when music data of at least one piece of music are stored in the memory circuit 16 without loading audio CD on the personal computer 5, the music data thus stored as music signal for mix.

With the first embodiment, as described above, the existing telephone set may be used as the telephone set 2A to allow both parties to enjoy a music signal as background sound in the call connected state. In addition, since an audio CD may be applied to mixing a music signal, the degree of freedom of music signals that can be mixed is increased. In addition, the parties on the phone may enjoy any one of the music pieces which either of the parties has selected by optionally setting the flags.

Basically, music signals are supplied effectively during the soundless period of speech signals, and hence are not obstructive to telephonic speech or conversation.

Transmitting signals are mixed with music signals, among the conditions, when a called telephone number is one of the registered telephone numbers, so as to optionally set up the mixing or refrain from mixing depending on e.g. a called party. For example, it can be selected whether or not a music signal is to be mixed with a speech signal depending on a called party being official or private.

Moreover, in an application in which the telephone set is of a broadband type capable of transmitting broadband speech signals, if a music signal in conformity with broadband speech signals may be mixed in the broadband, so that music pieces can be enjoyed with higher quality. In that application, since the IP network 4 is exploited also in mixing with a transmitting signal, the music may be of higher quality. In other words, a combination of the broadband telephone set with the use of an IP network renders the efficacy significantly higher.

Figure 7:
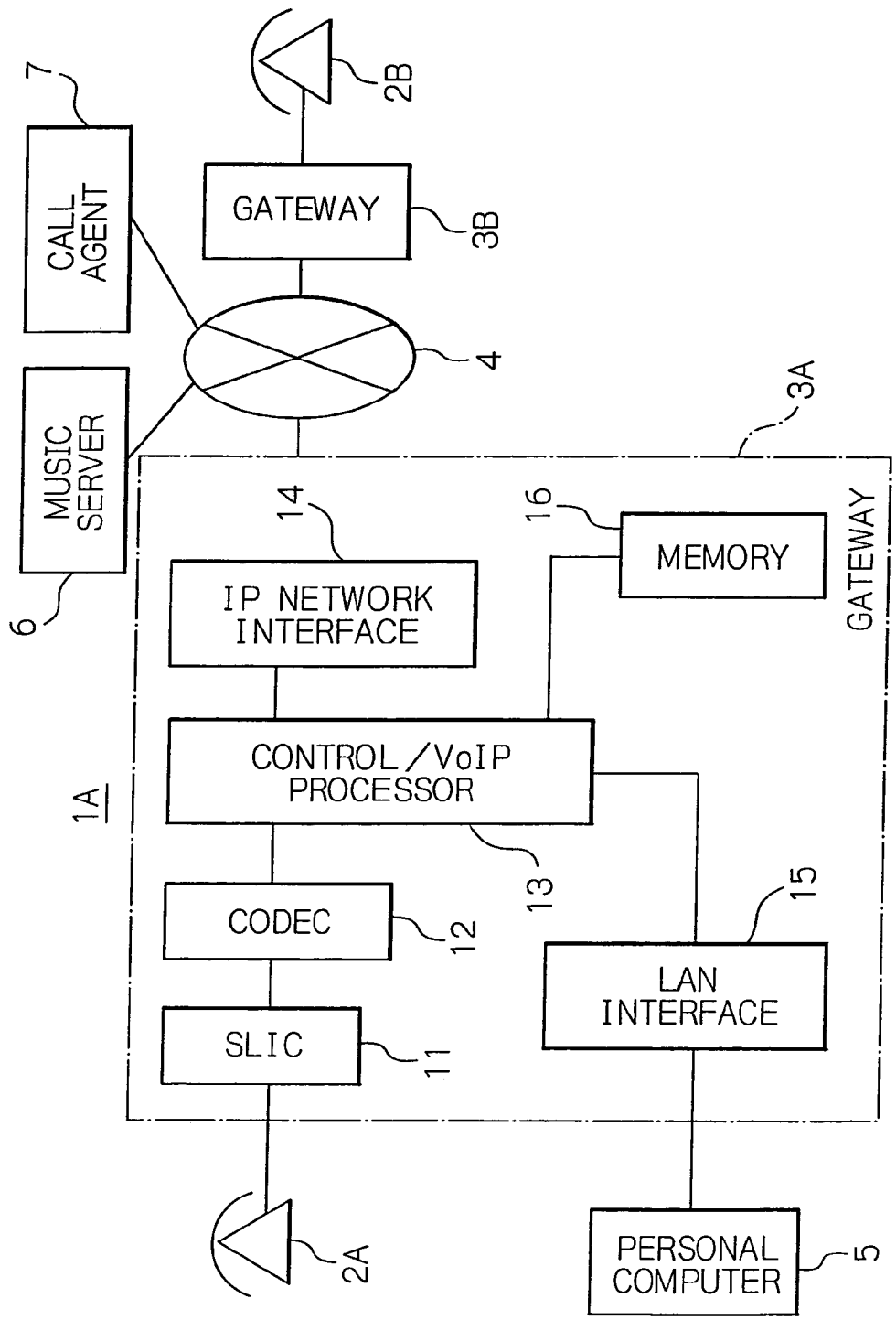
FIG. 7 is a schematic block diagram showing the structure of a telephone communications system in accordance with a second embodiment.

An alternative, second embodiment of the telephone communications apparatus and a telephone communications system according to the present invention is now described with further reference to FIG. 7. FIG. 7 is a schematic block diagram showing the inner structure of the second embodiment of the telephone communications apparatus and the telephone communications system. The parts or components which are the same as or similar to those shown in FIG. 2 are designated with the same or corresponding reference numerals.

Well, referring to FIG. 7, a voice communication system 1A in accordance with the second embodiment includes gateway devices 3A and 3B, connected to the IP network 4. The gateway devices 3A and 3B, telephone communications apparatus of the second embodiment, are interconnected to the telephone sets 2A and 2B, respectively. The telephone sets 2A and 2B are capable of communicating with each other with voice over the IP network 4.

In the instant second embodiment, the IP network 4 has a music server 6 and a call agent 7 interconnected. The music server 6 is adapted for distributing music signals representing music pieces. Preferably, music pieces distributed by the music server 6 may be periodically changed, from day to day or from one hour of the day to another, for example, so as to prevent the user from getting tired.

The call agent 7 is responsible for managing calls and, in the present second embodiment, holds the telephone numbers of subscribers who are under contract for the music distribution service. If a calling party or subscriber under contract for the music distribution service originates a call, the call agent 7 forwards a music signal provided from the music server 6 to the gateway devices 3A and 3B of the calling and called subscribers, respectively, in a session different from the session of a speech signal. The call agent 7 may be adapted to verify the contract from subscriber to subscriber so that, if the calling subscriber is under contract for the music distribution service, the call agent 7 may distribute a music signal from the music server 6 to the gateway device 3A of the calling subscriber, and, if the called subscriber is under contract for the music distribution service, the call agent 7 may distribute a music signal from the music server 6 to the gateway device 3B of the called subscriber. Plural sessions may be established for the gateway device 3A or 3B in accordance with, for example, the Session Initiation Protocol (SIP).

The component elements of the gateway devices 3A and 3B of the second embodiment are generally similar to those of the first embodiment, except the following respect. Specifically, the IP network interface 14 is able to cope with plural sessions simultaneously. The control/VoIP processor 13 has the music mixing function, exploiting the sound or soundless decision similar to that of the first embodiment, dedicatedly for received signal. The LAN interface 15 in the embodiment operates only for data transmission, without taking part in the music mixing function.

The processing flow will be described for mixing a music signal in the telephone communications system 1A of the second embodiment. When the subscriber of the telephone set 2A originates a call by off-hook and dials a called phone number, information on the calling and called phone numbers is imparted to the call agent 7 over the gateway device 3A.

The call agent 7 in turn confirms, based on the calling telephone number; whether or not the calling subscriber is under contract for the music distribution service. If the calling subscriber is not under contract for the music distribution service, the call agent 7 operates for establishing only the session of a speech channel between the gateway devices 3A and 3B.

If the calling subscriber is under contract for the music distribution service, the call agent 7 establishes the session of a speech channel between the gateway devices 3A and 3B, while establishing the sessions for distribution of a music signal between the gateway device 3A and the music server 6 and between the gateway device 3B and the music server 6, and initiating a music signal from being distributed by the music server 6 to the gateway devices 3A and 3B.

The gateway devices 3A and 3B recognize the establishment of the sessions with the music server 6 as the starting of the mixing and causes the distributed music signal to be mixed with a received signal to form a resultant speech signal.

With the second embodiment, the existing telephone set may be used as the telephone set 2A so that the calling/called parties may enjoy a music signal in the communication state as background sound.

Basically a music signal is supplied effectively during the soundless period of a speech signal, and hence is not obstructive to conversation on the phone.

Moreover, the music server 6 may be adapted to change music pieces carried by a music signal as desired so that the calling/called parties may enjoy music pieces which differ from day to day or from one time zone to another.

Figure 8:
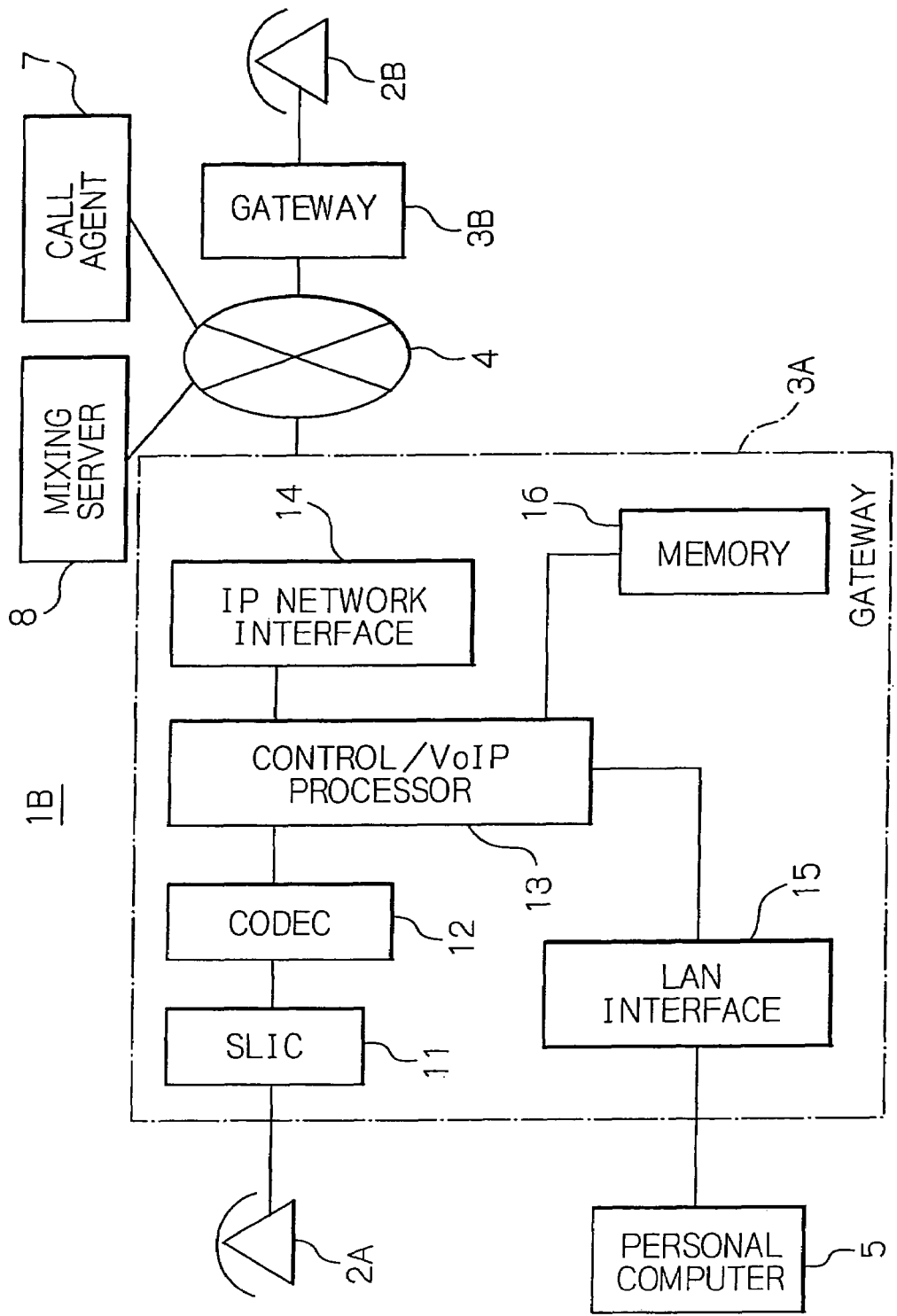
FIG. 8 is a schematic block diagram showing the structure of a telephone communications system in accordance with a third embodiment.

Referring further to FIG. 8, a further alternative, third embodiment of the telephone communications system is described in detail according to the present invention. FIG. 8 is a schematic block diagram showing the structure of a telephone communications system of the third embodiment. The parts or components which are the same as or similar to those shown in FIG. 7 are denoted with the same or corresponding reference numerals.

Referring to the figure, the third embodiment includes a voice communication system 1B having the gateway devices 3A and 3B, connected to the IP network 4. The gateway devices 3A and 3B have telephone sets 2A and 2B, respectively, interconnected thereto. The telephone sets 2A and 2B are capable of communicating with each other with voice over the IP network 4.

In the present third embodiment, the IP network 4 has a music server 8 and a call agent 7 interconnected thereto. The mixing server 8 includes the mechanisms for generating music signals and implementing the function of mixing a music signal with a transmitting and a received signal as owned by the gateway devices 3A and 3B of the first embodiment utilizing the sound/soundless decision. Preferably, a music signal, generated by the mixing server 8, is changed from day to day or from one time zone to another in order to prevent the calling/called subscribers from getting tired.

The call agent 7 is responsible for call management and, in the instant third embodiment, has stored therein the telephone numbers of subscribers who are in contract for the music mix service. If a calling subscriber under contract for the music mix service originates a call, the call agent 7 establishes a channel over the mixing server 8 between the gateway devices 3A and 3B, while having the mixing server 8 execute the mixing of a speech signal with a music signal.

The system may be adapted so that, if a calling subscriber is under contract for the music mixing service, the call agent 7 then mixes a music signal with speech signals from the gateway device 3A to the gateway device 3B and from the gateway device 3B to the gateway device 3A. The call agent 7 may also be adapted to confirm a subscription contract on the subscribers, so that, if a calling subscriber is under contract for the music mix service a music signal is mixed with a speech signal coming from the gateway device 3B and directed to the gateway device 3A, and so that, if a called subscriber is under contract for the music mix service, a music signal is mixed with a speech signal coming from the gateway device 3A and directed to the gateway device 3B.

The gateway devices 3A and 3B of the third embodiment may be general-purpose gateway devices not having the function of mixing music signals.

The processing flow will be described for mixing a music signal in the telephone communications system 1B of the third embodiment. When the subscriber of the telephone set 2A originates a call by off-hook and dials destination phone number information on the calling and called phone numbers is transmitted to the call agent 7 over the gateway device 63A.

The call agent 7 confirms whether or not the calling subscriber is under contract for the music distribution service based on the calling telephone number. If the calling subscriber is not under contract for the music distribution service, the call agent 7 then operates for establishing a usual speech channel between the gateway devices 3A and 3B.

If the calling subscriber is under contract for the music distribution service, the call agent 7 then establishes a speech channel or path over the mixing server 8 between the gateway devices 3A and 3B, while causing the mixing server 8 to start mixing. This executes the mixing of a music signal with a speech signal flowing in either direction.

The third embodiment is applicable to an existing telephone subscriber set or a gateway unit to allow the calling/called parties to enjoy the music mixing service to listen music as background sound in the communication or call-connected state.

Basically, with the illustrative embodiment, a music signal is supplied effectively during the soundless period of a speech signal, and hence is not obstructive to conversation on the phone.

Additionally, the mixing server 8 is able to change music pieces as desired, so that the calling/called parties may enjoy music which differs from day to day or from one time zone to another.

The embodiments have been described above, referring to the variety of structures. The present invention may further encompass variations which will be described hereinafter.

In the foregoing embodiments, music signals may be mixed with speech signals flowing in either direction. Alternatively, the mixing function maybe implemented only with either direction of speech signal flowing.

Moreover, in the foregoing embodiments, the same music signal is mixed with speech signals in both directions. Alternatively, music signals may be mixed which represent music pieces different in dependence upon the direction of speech signals.

In the above embodiments, the gateway devices are distinct from the telephone sets. Alternatively, the gateway device may be integrated into the telephone set, or may also be a processor device, termed a home server, also having the computer function.

In addition, in the foregoing embodiments, speech and music signals are mixed with each other in the digital signal form thereof. Alternatively, speech and music signals may be mixed together in the analog signal form thereof.

In the above embodiments, a music signal is mixed with a speech signal transmitted over an IP network. Alternatively, the system may be adapted to mix a music signal flowing on other types of network, such as a public switched telephone network. In an application where the gateway device copes with plural types of network, the mixing function may be implemented for all or some of those networks. In an application where the gateway device is compatible with the IP network and the public switched telephone network, the mixing function may be implemented only for speech signals transmitted over the IP network.

The above embodiments are adapted to determine whether or not the mixing is to be made without dependency on how the IP network is. Alternatively, the status of the IP network may also be taken into consideration in giving the decision. For example, if the IP network is in its overloaded condition or control IP packets are transmitted with significant delay, e.g. with respect to a threshold, the mixing may not be performed even though the remaining conditions for mixing are satisfactory.

The embodiments have been described above with music signals aimed for personal entertainment or taste. However, music signals may also represent commercial or theme songs of enterprises or effect sound such as sound of waves or human voice. The words "music signal" are to be interpreted as covering the possibility of other forms of signals, such as effect sound.

In the first embodiment, the device for generating a music signal is a personal computer having the function of a CD player. The generating device may also bean MD (Mini Disk) player or other types of device having the function of playing MDs for reproducing or playing back music signals.

In the above first embodiment, the data rate of music signals is designed to be in keeping with that of speech signals. Alternatively, the data rate of speech signals may be designed to be in keeping with music signals.

The second and third embodiments are adapted to determine whether or not the mixing is to be executed depending on the contract of subscribers on the service. Alternatively, the mixing function may be afforded as a common service for all of the subscribers.

Further alternatively, the second or third embodiment may be adapted to allow the contract subscriber to optionally set or change in which direction of speech signals the mixing is to be made or for which called telephone numbers the mixing is allowed in the call agent 7 (or a music server or a mixing server) by manipulating e.g. the PB buttons of a telephone set, as with the first embodiment described above. The system may also be adapted to allow the subscriber, before or after call connected, to transfer selection information on selecting a music signal to be mixed to the call agent 7 (or a music server or a mixing server) by manipulating e.g. the PB buttons of a telephone set.

In the second and third embodiments, the call agent 7 is separate from the music server 6 or the mixing server 8. However, one and the same server may be adapted to include all of those functions.

The second or third embodiment may not be adapted for utilizing the sound/soundless decision of a speech signal in mixing a music signal with a speech signal.

In an application in which the gateway device is able to cope with an IP network or public switched telephone network, a music signal to be mixed with a speech signal sent over the public switched telephone network may be taken out from the music server on the IP network as with the second embodiment.

In the second embodiment, the gateway device is adapted to mix a music signal from the music server with a received signal. Alternatively, the system may be adapted to mix a music signal with a transmitting signal, or with both of the transmitting and received signals. In the latter case, the mixing may be performed by either one of the gateway devices.

In the first, second and third embodiments, the gateway unit 3A is not limited to one physically separated from the telephone set 2A. For example, the gateway unit 3A may be of the type attachable to the telephone set 2A as an additional element or built in at the time of manufacture. For example, the gateway unit 3A may be adapted to incorporate therein circuitry corresponding to that of the telephone subscriber set 2A.

FIG. 9 exemplarily shows a telephone set 120 including a handset 122 and a telephone circuit 124. Telephone set 122 is connected to the CODEC 12, which is the same as included in the gateway unit 3A shown in FIG. 2. More specifically, the telephone set 120 integrally has the functions of telephone set 2A and the gateway unit 3A of the embodiment shown in FIG. 2. Those functioning elements are enclosed with a housing, which is symbolically designated with the same reference numeral 120 as the integrated telephone set. In the figure, like elements are designated with the same reference numerals, and redundant description will be avoided for simplicity.

The telephone circuit 124 may be adapted to include circuits corresponding to a transmitter and a receiver, not shown, functioning similarly to the telephone set 2A, FIG. 2. More specifically, the telephone circuit 124 is adapted for setting up, i.e. originating and/or receiving, a call selectively over either the IP network 4. The telephone circuit 124 has its handset 122 connected which includes a microphone and an earphone, not shown. The telephone circuit 124 may be implemented by digital circuit components. The integrated telephone subscriber set 120 is advantageously applicable to a broadband call exclusively established over the IP network 4.

The entire disclosure of Japanese patent application No. 2003-017078 filed on Jan. 27, 2003, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the cope and spirit of the present invention.

The invention claimed is:

1. A telephone communications apparatus comprising:
 a reproducing circuit for reading out a music signal recorded in a recording medium loaded thereon from the recording medium to reproduce the read out music signal;

a setting circuit responsive to an operation by an operator for setting whether or not the music signal is to be mixed with at least one of a transmitting signal and a received signal;

a mixer for mixing the music signal reproduced with at least one of the transmitting signal and the received signal;

a control circuit operative in response to said setting circuit for determining whether or not to enable said mixer to mix; and a decision circuit for determining a sound or soundless period of a speech signal with which the music signal is to be mixed, wherein said control circuit is responsive to a result from said decision circuit to control a mix ratio of the music signal to the speech signal and said control circuit progressively decreases the mix ratio towards a smallest value during transition from the soundless period to the sound period, said control circuit progressively increasing the mix ratio towards a largest mix ratio during transition from the sound period to the soundless period.

2. The apparatus according to claim 1, further comprising a telephone number register for setting information on a first telephone number for which the transmitting signal is to be destined with the music signal mixed with the transmitting signal or a second telephone number for which the transmitting signal is to be destined without mixing the music signal with the transmitting signal;

said control circuit allowing said mixer to mix the music signal with the transmitting signal when the transmitting signal is to be transmitted to a destination which is the first telephone number or not the second telephone number.

3. The apparatus according to claim 1, further comprising a content take-in circuit for taking in contents set in a counterpart setting circuit of a counterpart telephone communications apparatus which is to be connected, the counterpart setting circuit setting whether or not the music signal is to be mixed with at least one of a transmitting signal and a received signal;

said control circuit determining whether or not said mixer may mix based on the contents taken in.

4. The apparatus according to claim 1, further comprising a telephone circuit for communicating with each other with voice over a telephone network.

5. A telephone communications apparatus comprising:
a speech channel establishing circuit for establishing a speech channel over a telephone network;
a music channel establishing circuit for establishing a music channel in distinction from the speech channel, the music channel conveying a music signal provided from said telephone network;
a mixer for mixing the music signal with at least one of a transmitting signal and a received signal;
a decision circuit for determining a sound or soundless period of a speech signal with which the music signal is to be mixed; and
a control circuit responsive to a result from said decision circuit for controlling a mix ratio of the music signal to the speech signal wherein said control circuit progressively decreases the mix ratio towards a smallest value during transition from the soundless period to the sound period, said control circuit progressively increasing the mix ratio towards a largest value during transition from the sound period to the soundless period.

6. The apparatus according to claim 5, further comprising:
a setting circuit for allowing an operator to set whether or not the music signal is to be mixed with at least one of the transmitting signal and the received signal; and
a decision circuit responsive to said setting circuit for determining whether or not said mixer circuit is allowed to mix the music signal.

7. The apparatus according to claim 5, further comprising a telephone circuit for communicating with each other with voice over a telephone network.

8. A telephone communications system comprising:
a music signal mixer provided on a speech channel established between two telephone communications apparatus over a telephone network;
a decision circuit for determining whether the speech signal with which the music signal is to be mixed has a sound period or a soundless period; and
a control circuit responsive to a result from said decision circuit for controlling a mix ratio of the music signal to the speech signal wherein said control circuit progressively decreases the mix ratio towards a smallest value during transition from the soundless period to the sound period, said control circuit progressively increasing the mix ratio towards a largest value during transition from the sound period to the soundless period, and
said music signal mixer reproduces a music signal and mixes the music signal with a speech signal flowing in at least one direction and sending out a signal mixed.

9. The system according to claim 8, wherein said music signal mixer confirms that a calling or called subscriber of said telephone communications apparatus is under contract for a music distributing service to mix the music signal.

* * * * *

UNITED STATES PATENT AND TRADEMARK OFFICE
CERTIFICATE OF CORRECTION

PATENT NO. : 7,573,989 B2 Page 1 of 1
APPLICATION NO. : 11/189052
DATED : August 11, 2009
INVENTOR(S) : Usuba et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1050 days.

Signed and Sealed this

Seventh Day of September, 2010

David J. Kappos
*Director of the United States Patent and Trademark Office*